United States Patent
Patel et al.

(10) Patent No.: US 11,129,150 B2
(45) Date of Patent: *Sep. 21, 2021

(54) SHORTENED TRANSMISSION TIME INTERVAL (STTI) CONFIGURATION FOR LOW LATENCY COMMUNICATIONS

(71) Applicant: QUALCOMM Incorporated, San Diego, CA (US)

(72) Inventors: Shimman Arvind Patel, San Diego, CA (US); Wanshi Chen, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/847,456

(22) Filed: Apr. 13, 2020

(65) Prior Publication Data

US 2020/0245322 A1 Jul. 30, 2020

Related U.S. Application Data

(63) Continuation of application No. 16/001,739, filed on Jun. 6, 2018, now Pat. No. 10,624,072.

(Continued)

(51) Int. Cl.
*H04W 72/04* (2009.01)
*H04W 72/08* (2009.01)
(Continued)

(52) U.S. Cl.
CPC ....... *H04W 72/0413* (2013.01); *H04L 5/0007* (2013.01); *H04W 72/042* (2013.01);
(Continued)

(58) Field of Classification Search
None
See application file for complete search history.

(56) References Cited

U.S. PATENT DOCUMENTS

2016/0135182 A1* 5/2016 Jung ............... H04L 5/0064
370/336
2016/0353475 A1 12/2016 Au et al.
(Continued)

FOREIGN PATENT DOCUMENTS

WO 2016064544 A1 4/2016

OTHER PUBLICATIONS

International Search Report and Written Opinion—PCT/US2018/036376—ISA/EPO—dated Sep. 4, 2018.
(Continued)

*Primary Examiner* — Anh Ngoc M Nguyen
(74) *Attorney, Agent, or Firm* — Patterson + Sheridan, L.L.P.; Timothy R. Hirzel

(57) ABSTRACT

Methods and apparatus are provided for shortened Transmission Time Interval (sTTI) configurations for low latency communications. A User Equipment (UE) receives at least one transmission in a first TTI of a first duration configured for the UE, the first TTI assigned within a second TTI of a second duration, wherein the first TTI is configured for Ultra-Reliable and Low-Latency Communications (URLLC) and uses, at least in part, a configuration for communicating using the second TTI.

29 Claims, 13 Drawing Sheets

Related U.S. Application Data

(60) Provisional application No. 62/517,915, filed on Jun. 10, 2017.

(51) Int. Cl.
*H04W 72/14* (2009.01)
*H04L 5/00* (2006.01)
*H04W 72/12* (2009.01)

(52) U.S. Cl.
CPC ..... *H04W 72/085* (2013.01); *H04W 72/1278* (2013.01); *H04W 72/14* (2013.01); *H04L 5/001* (2013.01); *H04L 5/0048* (2013.01); *H04W 72/0446* (2013.01)

(56) References Cited

U.S. PATENT DOCUMENTS

| | | | |
|---|---|---|---|
| 2017/0273071 A1* | 9/2017 | Nogami | H04W 74/085 |
| 2017/0331547 A1* | 11/2017 | Kim | H04L 5/0012 |
| 2018/0077658 A1* | 3/2018 | Nory | H04L 5/0055 |
| 2018/0359742 A1 | 12/2018 | Patel et al. | |
| 2019/0021024 A1* | 1/2019 | Yoshizawa | H04L 1/1887 |
| 2019/0116592 A1* | 4/2019 | Moon | H04L 5/0044 |
| 2019/0158327 A1 | 5/2019 | Suzuki et al. | |

OTHER PUBLICATIONS

LG Electronics: "Discussions on sPDCCH for Latency Reduction", 3GPP Draft; R1-1609214, Discussions on SPDCCH for Latency Reduction_V2, 3rd Generation Partnership Project (3GPP), Mobile Competence Centre; 650, Route Des Lucioles; F-06921, Sophia-Antipolis Cedex; RAN WG1, Lisbon, Portugal; Oct. 10, 2016-Oct. 14, 2016, Oct. 9, 2016 (Oct. 9, 2016), XP051149260, 8 pages, Retrieved from the Internet: URL:http://www.3gpp.org/ftp/Meetings_3GPP_SYNC/RAN1 /Docs/ [retrieved on Oct. 9, 2016].

Qualcomm Incorporated: "DL Channel Design for Shortened TTI," 3GPP Draft; R1-164458, 3rd Generation Partnership Project (3GPP), Mobile Competence Centre; 650, Route Des Lucioles; F-06921 Sophia-Antipolis Cedex; France, vol. RAN WG1, No. Nanjing, China; May 23, 2016-May 27, 2016, May 14, 2016 (May 14, 2016), pp. 1-7, XP051096436, Retrieved from the Internet: URL: http://www.3gpp.org/ftp/tsg_ran/WG1_RL1/TSGR1_85/Docs/ [retrieved on May 14, 2016] paragraph [02.1].

Qualcomm Incorporated: "UL Channel Design for Shortened TTi", 3GPP Draft; R1-163069, UL Channel Design for Shortened TTI, 3rd Generation Partnership Project (3GPP), Mobile Competence Centre; 650, Route Des Lucioles; F-06921 Sophia-Antipolis Cedex; France, vol. RAN WG1, Busan, Korea; Apr. 11, 2016-Apr. 15, 2016, Apr. 2, 2016 (Apr. 2, 2016), XP051080513, 8 pages, Retrieved from the Internet: URL: http://www.3gpp.org/ftp/tsg_ran/WG1_RL1/TSGR1_84b/Docs/ [retrieved on Apr. 2, 2016].

\* cited by examiner

SHORTENED TRANSMISSION TIME INTERVAL (STTI) CONFIGURATION FOR LOW LATENCY COMMUNICATIONS

This application is a continuation application of U.S. application Ser. No. 16/001,739, filed on Jun. 6, 2018, which claims priority to U.S. Provisional Application Ser. No. 62/517,915, filed on Jun. 10, 2017, each of which is expressly incorporated by reference in its entirety.

FIELD

The present disclosure relates generally to wireless communication systems, and more particularly, to configurations for a shortened Transmission Time Interval (TTI) for low latency communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5$^{th}$ generation (5G) network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications by a User Equipment (UE). The method generally includes receiving at least one transmission in a first Transmission Time Interval (TTI) of a first duration configured for the UE, the first TTI assigned within a second TTI of a second duration, wherein the first TTI is configured for Ultra-Reliable and Low-Latency Communications (URLLC) and uses, at least in part, a configuration for communicating using the second TTI, and processing the received at least one transmission.

Certain aspects provide a method for wireless communications by a Base Station (BS). The method generally includes assigning at least one transmission in a first Transmission Time Interval (TTI) of a first duration configured for at least one UE, the first TTI assigned within a second TTI of a second duration, wherein the first TTI is configured for Ultra-Reliable and Low-Latency Communications (URLLC) and uses, at least in part, a configuration for communicating using the second TTI, and transmitting the assigned at least one transmission in the first TTI.

Certain aspects provide an apparatus for wireless communications by a User Equipment (UE). The apparatus generally includes means for receiving at least one transmission in a first Transmission Time Interval (TTI) of a first duration configured for the UE, the first TTI assigned within a second TTI of a second duration, wherein the first TTI is configured for Ultra-Reliable and Low-Latency Communications (URLLC) and uses, at least in part, a configuration for communicating using the second TTI, and means for processing the received at least one transmission.

Certain aspects provide an apparatus for wireless communications by a Base Station (BS). The apparatus generally includes means for assigning at least one transmission in a first Transmission Time Interval (TTI) of a first duration configured for at least one UE, the first TTI assigned within a second TTI of a second duration, wherein the first TTI is configured for Ultra-Reliable and Low-Latency Communications (URLLC) and uses, at least in part, a configuration for communicating using the second TTI, and means for transmitting the assigned at least one transmission in the first TTI.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
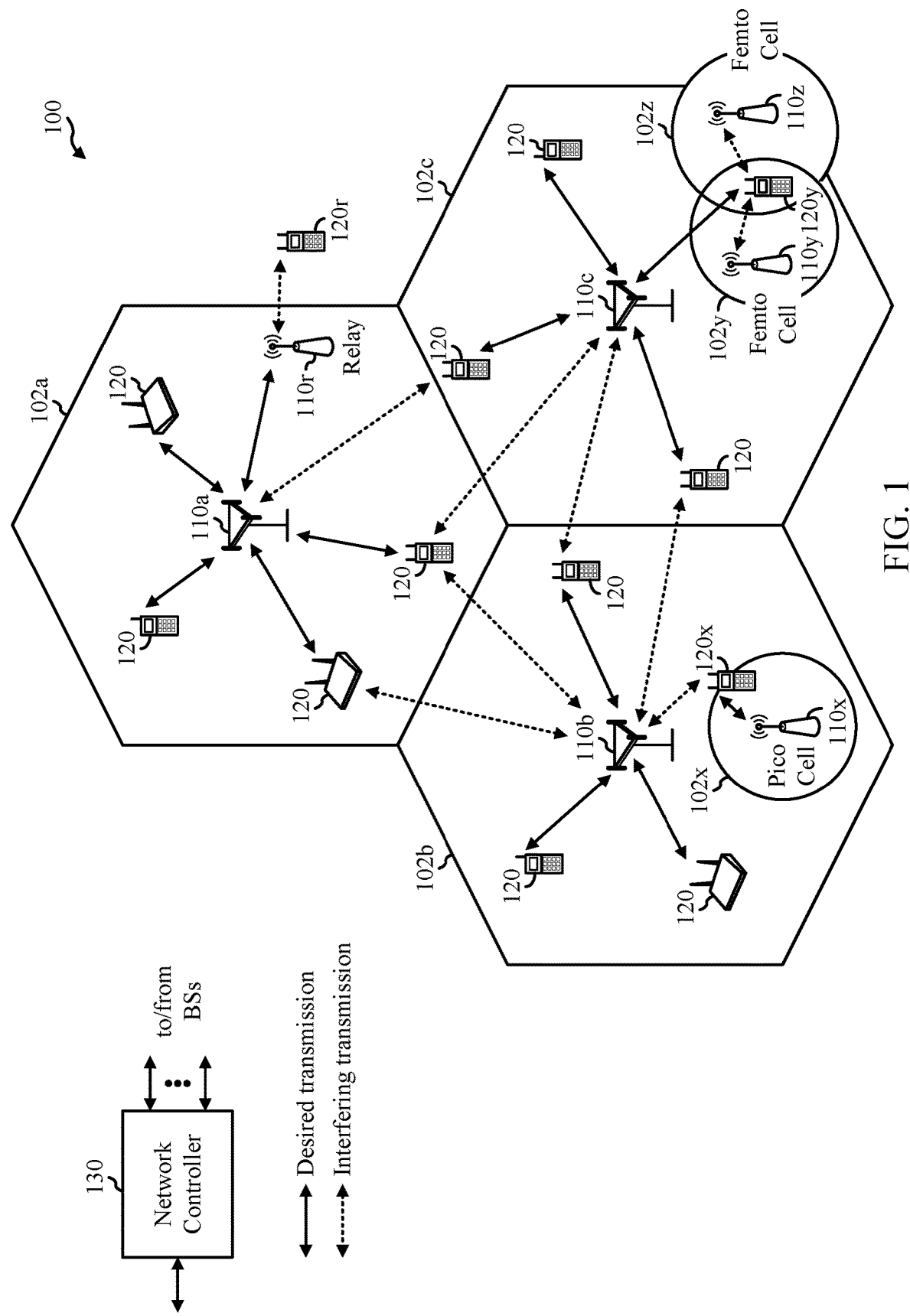
FIG. 1 is a block diagram conceptually illustrating an example telecommunications system, in accordance with certain aspects of the present disclosure.

3GPP wireless communication standards (e.g., RAN 1 specification) have proposed TTIs with shorter durations (e.g., shortened TTIs (sTTI) for low latency communication.

A base station may transmit to one or more UEs using a transmission time interval (TTI) that is reduced in length. Such a TTI may be referred to as a shortened TTI (sTTI) and a user receiving a sTTI may be a low latency user. A sTTI may be divided into a number of resource blocks across a system bandwidth, and each of the resource blocks may be allocated to a UE by a base station. The base station may transmit control information or a control message in a first portion (e.g., control region) of a resource block to provide resource allocations. A low latency user may attempt to decode the control information in the resource block to determine a data region allocated within the same sTTI.

In certain aspects, sTTIs of 1 symbol duration may be needed in order to support Ultra-Reliable and Low-Latency Communications (URLLC). URLLC requires sending a 32 byte packet with less than $10^{-5}$ transmission error rate and with less than 1 ms delay. A one-symbol sTTI may meet this requirement as it may allow for up to three transmission attempts within 1 ms assuming a HARQ turnaround time of 8 symbols and assuming immediate, back to back transmission attempts.

However, current standards (e.g., RAN 1 specification) proposals are for sTTI of 2 symbols duration and 1 slot, which supports ULLC requirements. In certain aspects, standardizing one symbol sTTI as a standalone mode may require considerable design effort and changes and may further increase complexity of the base station scheduler and UE receiver. Thus, there is a need to modify current sPDCCH channel proposal such that it enables one-symbol sTTI transmissions with minimal changes to the current sTTI configuration and signaling overhead.

Certain aspects of the present disclosure discuss various techniques to enable 1-symbol sTTI operation within the current 2-symbol and 1 slot sTTI design by using, at least in part, 2-symbol sTTI configuration. In certain aspects, the modified 2-symbol sTTI design for enabling 1-symbol sTTI operation meets most of the design and performance goals discussed later in this specification.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth (e.g., system frequency band) into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
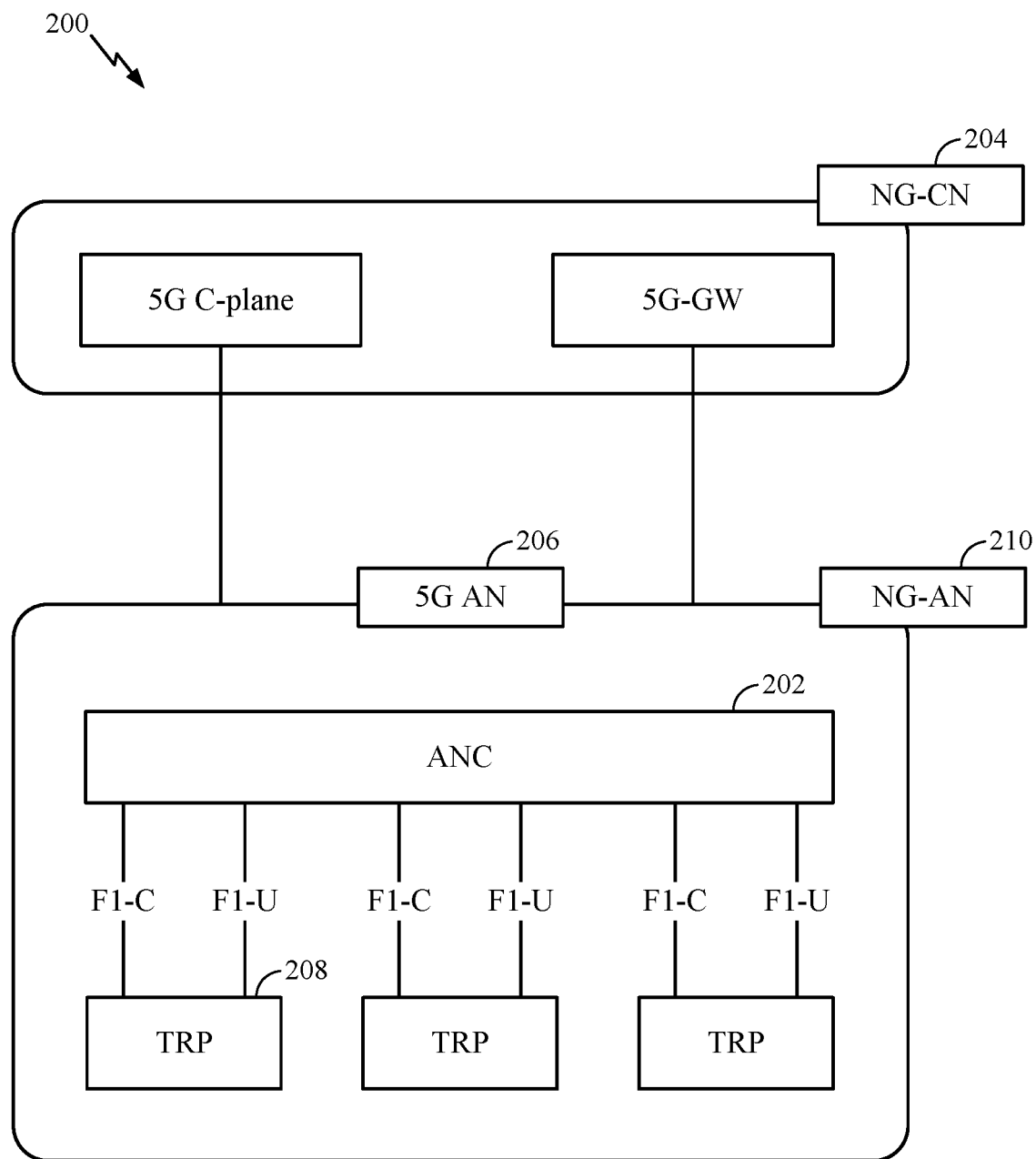
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
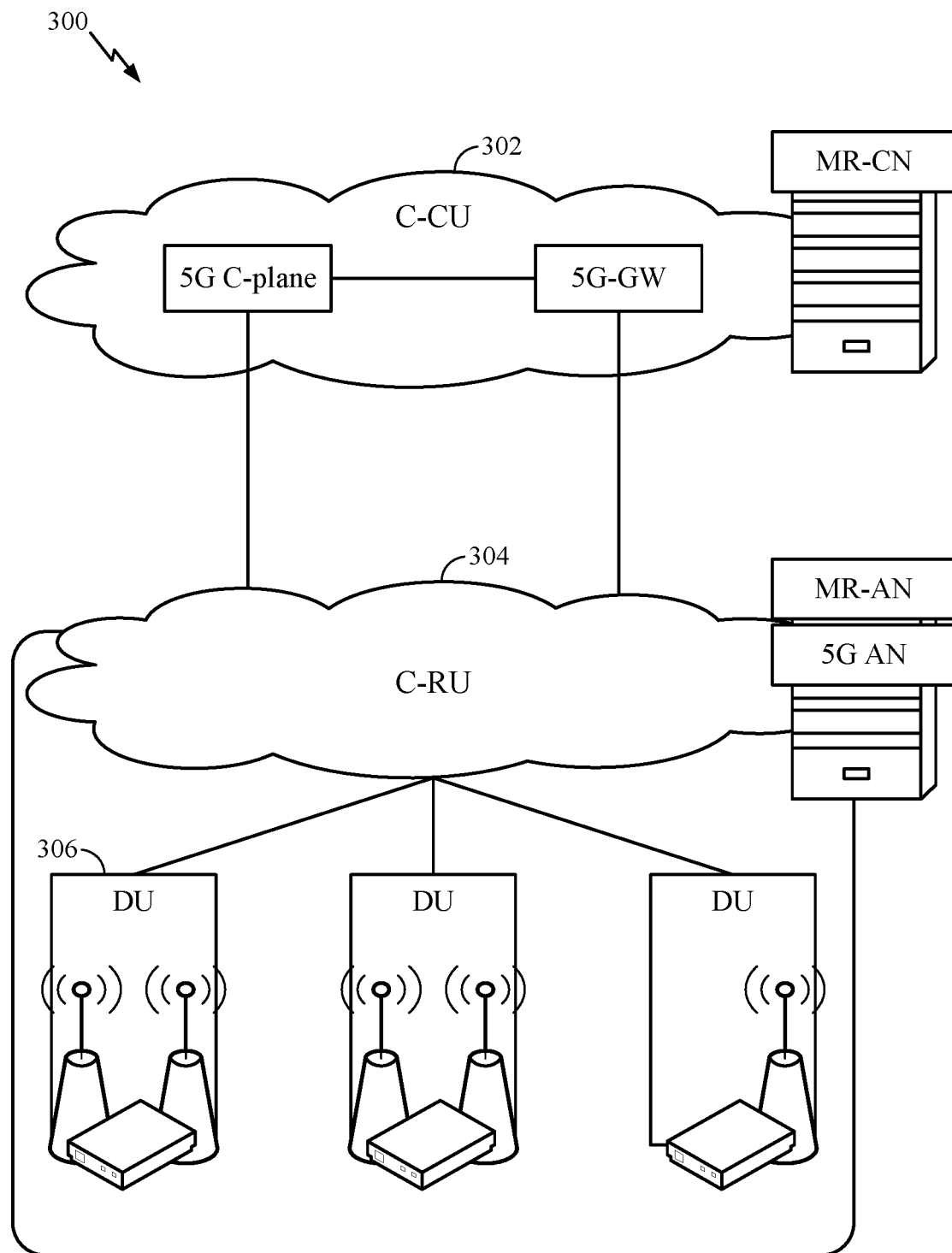
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
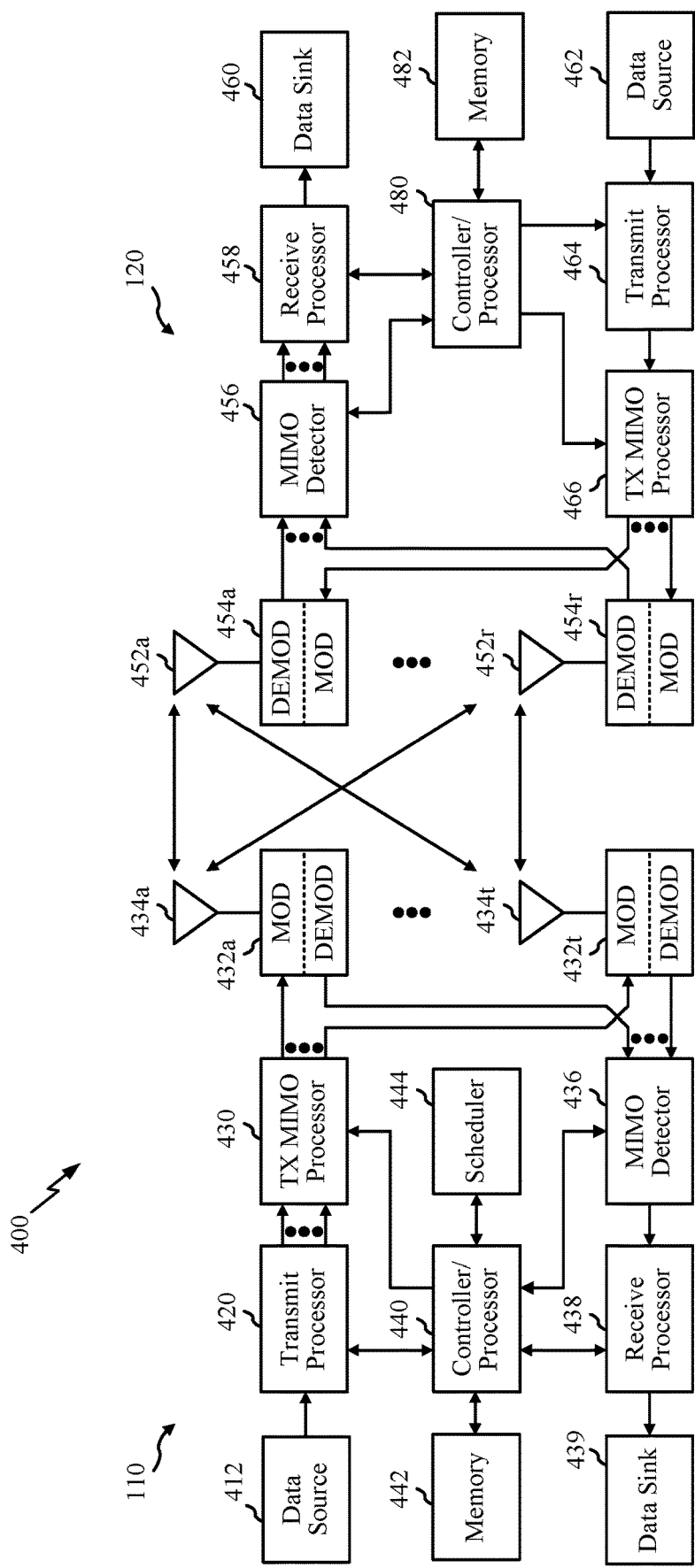
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 8-11.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processings can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 10, and/or other processes for the techniques described herein. The processor 480 and/or other processors and modules at the UE 120 may perform or direct, e.g., the execution of the functional blocks illustrated in FIG. 11, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
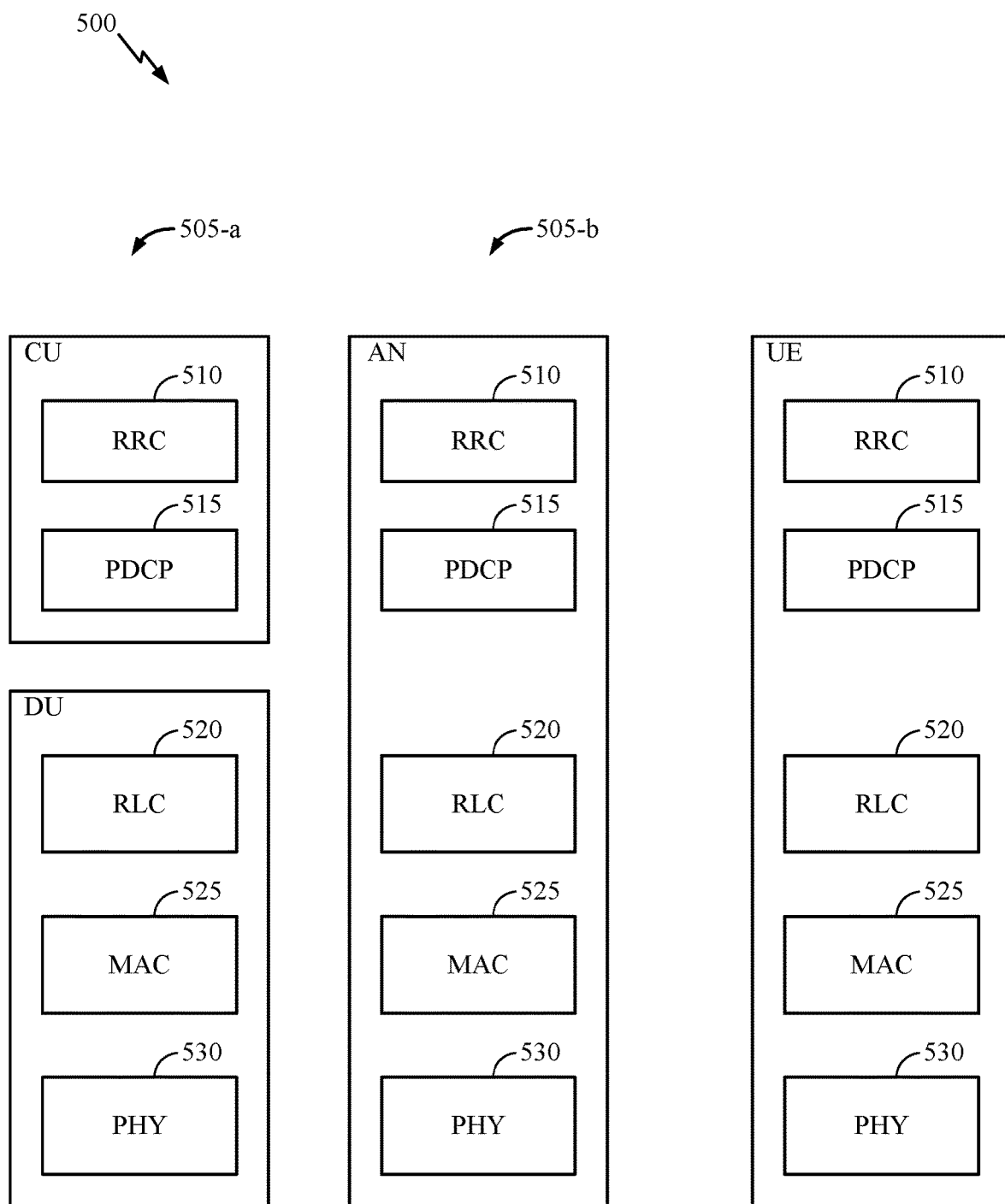
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
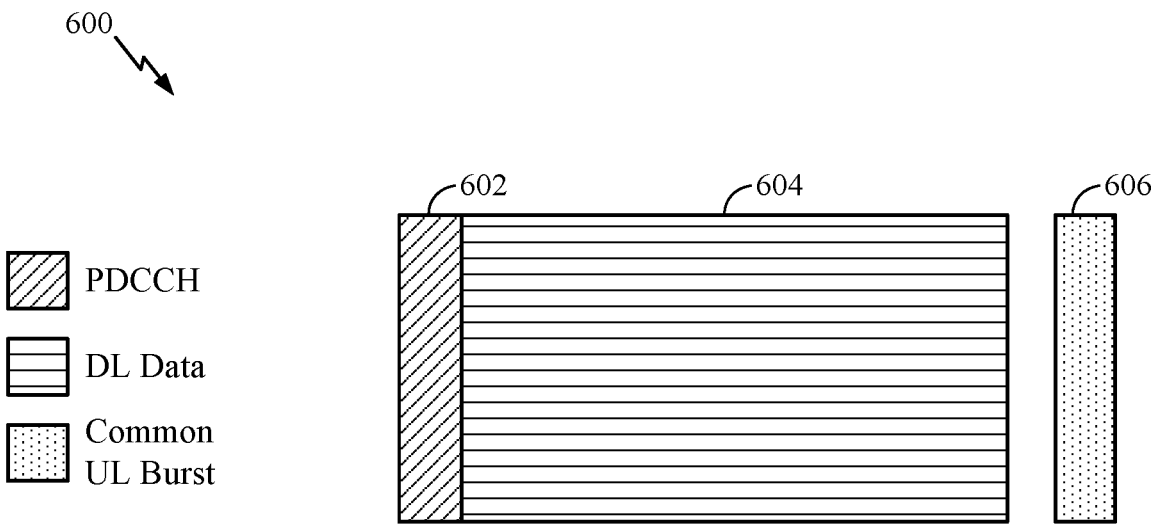
FIG. 6 illustrates an example of a downlink-centric (DL-centric) subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
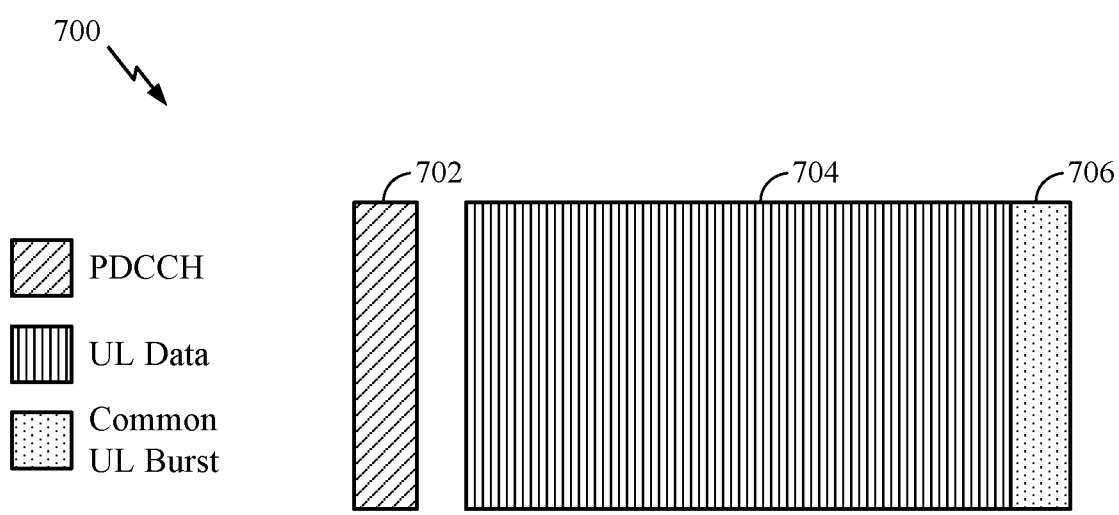
FIG. 7 illustrates an example of an uplink-centric (UL-centric) subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL data portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switchover from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Configurations for Shortended Transmission Time Intervals (STTI) for Low Latency Communication 3GPP wireless communication standards (e.g., RAN 1 specification) have proposed TTIs with shorter durations (e.g., shortened TTIs (sTTI) for low latency communication.

A base station may transmit to one or more UEs using a transmission time interval (TTI) that is reduced in length. Such a TTI may be referred to as a shortened TTI (sTTI) and a user receiving a sTTI may be a low latency user. A sTTI may be divided into a number of resource blocks across a system bandwidth, and each of the resource blocks may be allocated to a UE by a base station. The base station may transmit control information or a control message in a first portion (e.g., control region) of a resource block to provide resource allocations. A low latency user may attempt to decode the control information in the resource block to determine a data region allocated within the same sTTI.

A control region may be located at the beginning of a resource block, and a UE may receive and decode the control information transmitted in the control region to determine that the data region of the resource block has been allocated for that UE. Mechanisms for efficient reception and decoding of this control information is desired. In addition, the mechanisms for reducing the size of the control region, and/or otherwise maximizing the size of the data region of the resource block relative to the control region, or even eliminating one or more of the control regions from one or more of the resource blocks of the sTTI to minimize the impact of control overhead are desired.

In certain aspects, a downlink grant may be transmitted at the beginning of a control message in a control region of a sTTI, and uplink grants may be transmitted at the end of the control region. A configuration that anchors the downlink grant at the beginning of the control region, and anchors the one or more uplink grants, if any, at the end of the downlink control message, may reduce the number of blind decodes that a receiving UE needs to perform, and/or allow for the processing of the downlink grant to begin prior to the UE completing searching for uplink grants. Thus, processing time and latency may be optimized. In addition, in some cases, one or more bits may be added (e.g., to an information field) to a downlink grant to indicate a position within the control region of a sTTI for the start of the uplink grants. This indication may allow for a number of different aggregation levels to be used, while allowing for unused portions of the control region to be reallocated as part of the data region.

In certain aspects, a sTTI may include a number of resource blocks, each of which may be assigned to a low latency user. In some cases, a downlink grant, which may be included in a control message in a control region at the beginning of a resource block, may be used to indicate the allocation of the data region of that resource block to a particular user. A number of bits corresponding to the number of other resource blocks (e.g., the total number of resource blocks of the sTTI minus one) may be added to the downlink grant to indicate whether the downlink grant may also be subsequent resource blocks in the sTTI. As such, control channel overhead may be reduced by reducing a total number of downlink grants, while minorly changing the total size of each downlink grant.

In certain aspects, a base station (e.g., base station 110 of FIG. 1) may transmit resource allocations and other control information in one or more shortened PDCCH (sPDCCH) transmissions to the UE (e.g., UE 120 of FIG. 1). The resource allocations may include one or both of downlink grants and uplink grants of resources for transmission of downlink data (e.g., in a shortened PDSCH, sPDSCH) and uplink data (e.g., in a shortened PUSCH, sPUSCH) respectively for the UE 120.

A sTTI for low latency communications may have multiple resource blocks, which may span the whole system bandwidth or a portion of the system bandwidth. The resource blocks may have the same or different sizes in frequency domain. Each resource block may be allocated for a single user or multiple users. The users may access one, multiple, or all of the resource blocks of the sTTI, depending on their configuration. The resource block structure used may be defined by higher level signaling, for example, for a semi-static configuration.

A resource block in a sTTI may have a sPDCCH associated with the resource block. The sPDCCH may be embedded in the resource block. The sPDCCH may be at the beginning of the resource block (e.g., in the first one or more symbols of the resource block) to enable early decoding of the sPDCCH in the resource block. The sPDCCH may span the bandwidth of the resource block, or may occupy less than the full bandwidth of the resource block, with additional signaling included above (e.g., at a higher frequency) and/or below (e.g., at a lower frequency) the resource elements occupied by the sPDCCH in the resource block. In some cases, a sPDCCH may allocate a sPDSCH to a low latency user for a resource block.

In certain aspects, a sPDCCH for one resource block within a sTTI for a user may include a downlink grant for one or more additional resource blocks within the sTTI for the same user. For example, as described above, the sPDCCH may be in the first portion of the sTTI block (e.g., in the first symbol of the sTTI) at a predefined location within the resource block of the sTTI. A low latency user may monitor the control region (e.g., the sPDCCH) for each sTTI resource blocks to determine whether a downlink grant of resources has been sent (e.g., from a serving base station 110) in the sPDCCH to the low latency user. A low latency user may search for both uplink and downlink grants in the sPDCCH.

As described above, a sPDCCH may be positioned at the beginning of a resource block of a sTTI. In addition, a downlink grant of the sPDCCH may be positioned at the beginning of the sPDCCH. By providing the downlink grant for a low latency user in a same position of each sPDCCH, a search space for the low latency user may be reduced. In some examples, if a low latency user searches for a control message (e.g., for a downlink grant of resources) for that user in a sPDCCH, and successfully identifies the presence of a downlink grant, the low latency user may infer that the associated sPDSCH of that resource block is allocated for that low latency user. Thus, the low latency user may efficiently identify the sPDSCH allocated to itself.

In certain aspects, the downlink grant may include one or more bits that point to other resource blocks of the sTTI comprising a sPDSCH, for that same low latency user. In some cases, the one or more bits may include resource assignment information. Each of the one or more bits may indicate whether or not a resource block is allocated for the same low latency user. For example, if a sTTI includes three resource blocks, two downlink grant bits in a sPDCCH of one resource block may be used to indicate whether the downlink grant is for any of the other three resource blocks for the low latency user.

In certain aspects, downlink grants in other resource blocks may be for one or more other low latency users, and may likewise indicate that the sPDSCH in the resource block containing the sPDCCH with the downlink grant is for one or more of the other low latency users, and one or more bits (e.g., two bits for three resource blocks) may be used to indicate whether any of the other resource blocks are for one or more of the other low latency users. The bits may be appropriately indexed and the resource block to which they relate may be based on a position of the resource block in which the one or more bits of the downlink grant appear. The above-described procedure may efficiently indicate downlink grants, at least in part, because a low latency user may only need to perform a blind decode in a fixed position of the sPDCCH within the resource block, and a number of blind decodes used to determine the downlink grant may be limited to a number of resource blocks configured by a base station in the sTTI.

The uplink grants of a sPDCCH RB set already containing a downlink grant may be separated from the downlink grants. For example, the downlink grants may be transmitted at the beginning of the sPDCCH control region, and the uplink grants may be sent at the end of the sPDCCH control region. As used herein, the sPDCCH control region may be a virtual control region, for example meaning that the resource elements of the sPDCCH may not all be adjacent in the time-frequency domain. The downlink and uplink grants of a sPDCCH may be separated at least in part so that the downlink and uplink grant search spaces do not overlap. Providing the downlink grant at a fixed position relative to a boundary of the sPDCCH control region, and uplink grants at a fixed position relative to another boundary of the sPDCCH control region may reduce the number of blind decode attempts for a low latency user. In addition, because a downlink grant may be received at a set or predetermined position that is separated from a search space for the one or more uplink grants, UE 120 may begin to decode the downlink grant prior to completing a blind decoding process for the uplink grants. In some cases, downlink grant processing and uplink grant blind decoding may proceed in parallel, thus increasing efficiency by decreasing the amount of time needed for the UE 120 to receive and process a sPDCCH.

A position of each of the uplink grants to be transmitted in a sPDCCH may be determined by the base station 110 based at least in part on the uplink grant aggregation level. As described above, the base station 110 may transmit an indication of the uplink grant aggregation level to a low latency user in a prior grant message. The base station 110 may statically define uplink grant locations for each of multiple aggregation levels. In other examples, multiple uplink grant locations may be defined for a particular aggregation level. Multiple uplink grant locations may result in a greater number of blind decoding attempts by the UE 120, since there are an increased number of potential uplink grant locations for the UE 120.

In some examples, the size of the sPDCCH control region may be at least large enough to accommodate a nominal level of grants and aggregation levels without overlap of the downlink grants and uplink grants at the various aggregation levels. As such, a portion of the sPDCCH control region may be unused. The size of the unused portion of the sPDCCH control region may depend on a number of uplink grants and the aggregation level for a particular sPDCCH. This unused sPDCCH control region may be repurposed by including an indication in the downlink grant of the sPDCCH (e.g., a sPDCCH rate matching information field) that indicates the start of the uplink grants in the sPDCCH. The UE 120 that holds the downlink grant may rate match the sPDSCH data region around the downlink grant and uplink grants, if any, to use this otherwise unallocated portion of the sPDCCH as an additional portion of the sPDSCH. The size of this indicator may provide the number of available positions to start the uplink grants in the sPDCCH. For example, where the indictor includes three bits, one of eight possible positions for the start of the uplink grants may be indicated.

Figure 8:
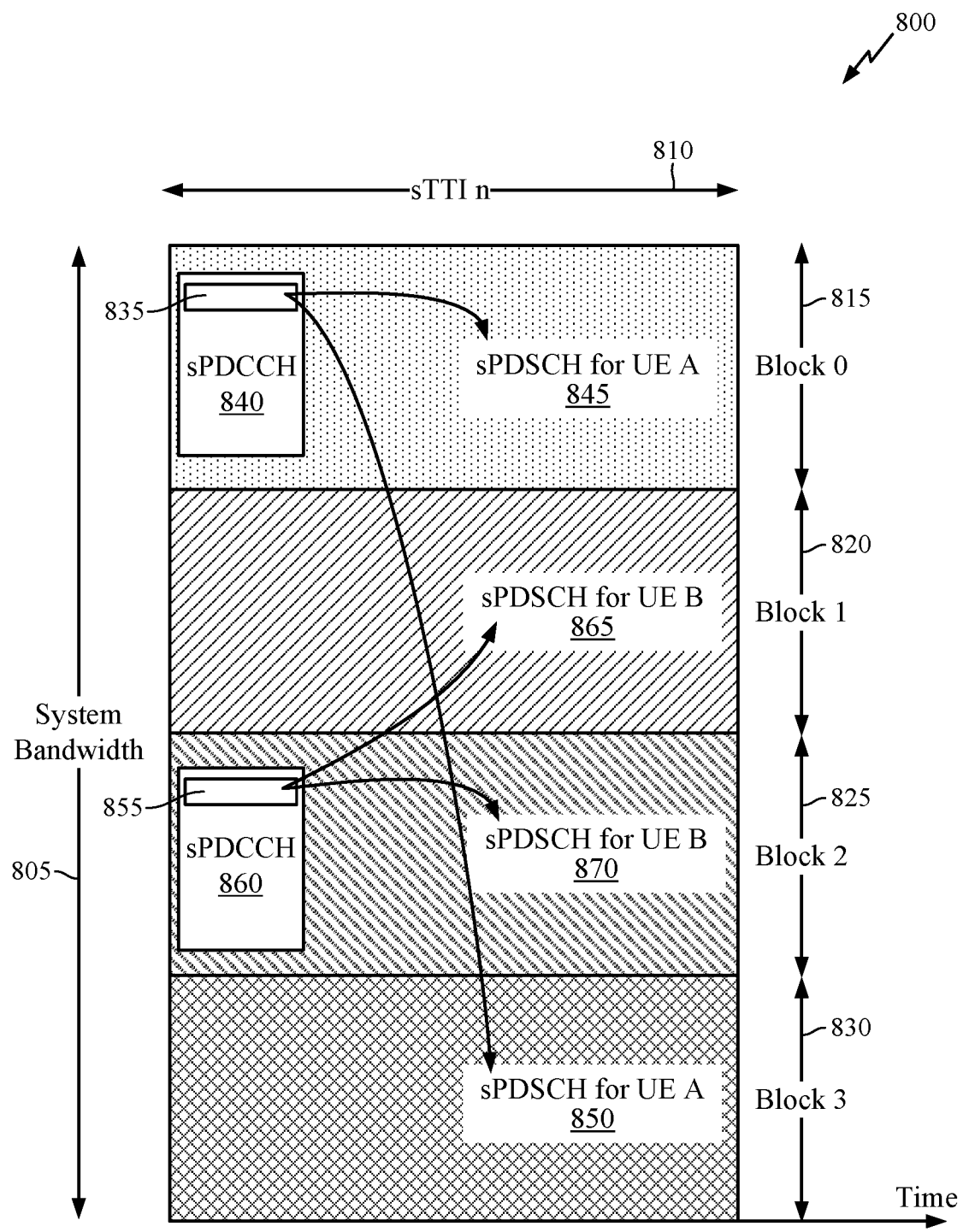
FIG. 8 illustrates an example of a resource allocation diagram 800 for low latency applications, in accordance with certain aspects of the present disclosure

FIG. 8 illustrates an example of a resource allocation diagram 800 for low latency applications, in accordance with certain aspects of the present disclosure. Resource allocation diagram 800 may include sTTI 810 occupying a system bandwidth 805. In some cases, the sTTI 810 may represent a sTTI within a legacy TTI, or a separate TTI. In some examples, and as may be the case with other sTTIs described here, sTTI 810 may be of different durations. For example, in some cases, sTTI 810 may be spread over a two symbol periods, or a single slot width associated with a legacy TTI, or another time period. In this example, sTTI 810 includes four resource blocks: resource block 815 and resource block 830 for UE A, and resource block 820 and resource block 825 for UE B.

A base station (e.g., base station 110 of FIG. 1) may generate a downlink grant 835 to be included in a sPDCCH 840, the control region of resource block 815. In an aspect, for a two symbol sTTI, the control region of a resource block is allocated within the first symbol duration of the sTTI. Further, sPDCCH region within an sTTI resource block is communicated to UEs via RRC signaling. The downlink grant 835 may be for sPDSCH 845 of the resource block 815. In some cases, the sPDSCH 845 may be in a first symbol period of the resource block 815. In some cases, the downlink grant 835 may be in a data region of the resource block 815. The downlink grant may also be for a second sPDSCH, sPDSCH 850, in a data region of resource block 830 that are also for UE A, to be jointly used to receive data at UE A based on the control information of downlink grant 835.

A base station may also generate a second downlink grant 855 to be included in a sPDCCH 860, the control region of resource block 825. The downlink grant 855 may be for the sPDSCH 870 of the resource block 825, and may also be for the sPDSCH for resource block 820.

For both downlink grants, one or more bits in each of downlink grant 835 and downlink grant 855 may be generated by a base station to indicate other resource blocks of the sTTI that include a sPDSCH for that same low latency user. In this example, sTTI 810 includes four resource blocks. Downlink grant 835 for the UE A may thus include three bits to indicate whether the downlink grant 835 is for any of the other three resource blocks for the UE A.

In one example, the bits of the indication may make up or be a part of a resource allocation field in the downlink grant 835. In other examples, the bits of the indication may be included at another position in a sPDCCH, such as sPDCCH 840, or elsewhere within the control region of a resource block, such as resource block 815. The first bit of the indication may be associated with resource block 820, the second bit may be associated with resource block 825, and the third bit may be associated with resource block 830. The receiving UEs, UE A and UE B may infer the relationship between the bits and the resource blocks. For example, the first bit may be associated with the first resource block of the sTTI 810 that does not contain the downlink grant having the bits of the indication, and so on. In the example shown in resource allocation diagram 800 with respect to sTTI 810, in downlink grant 835, the third bit of the indication may identify the fourth resource block 830 as for UE A. In downlink grant 855, the second bit of the indication may identify the second resource block 820 as for UE B.

The above-described configuration may efficiently indicate downlink grants at least in part because a low latency user may only need to perform a blind decode in a fixed position of the sPDCCH within the resource block, and a number of blind decodes used to determine the downlink grant may be limited to a number of resource blocks configured by a base station (e.g., cell) in the sTTI. Furthermore, the maximum number of bits in the indication of the downlink grant may also be limited to the number of resource blocks of the sTTI minus one.

Figure 9A:
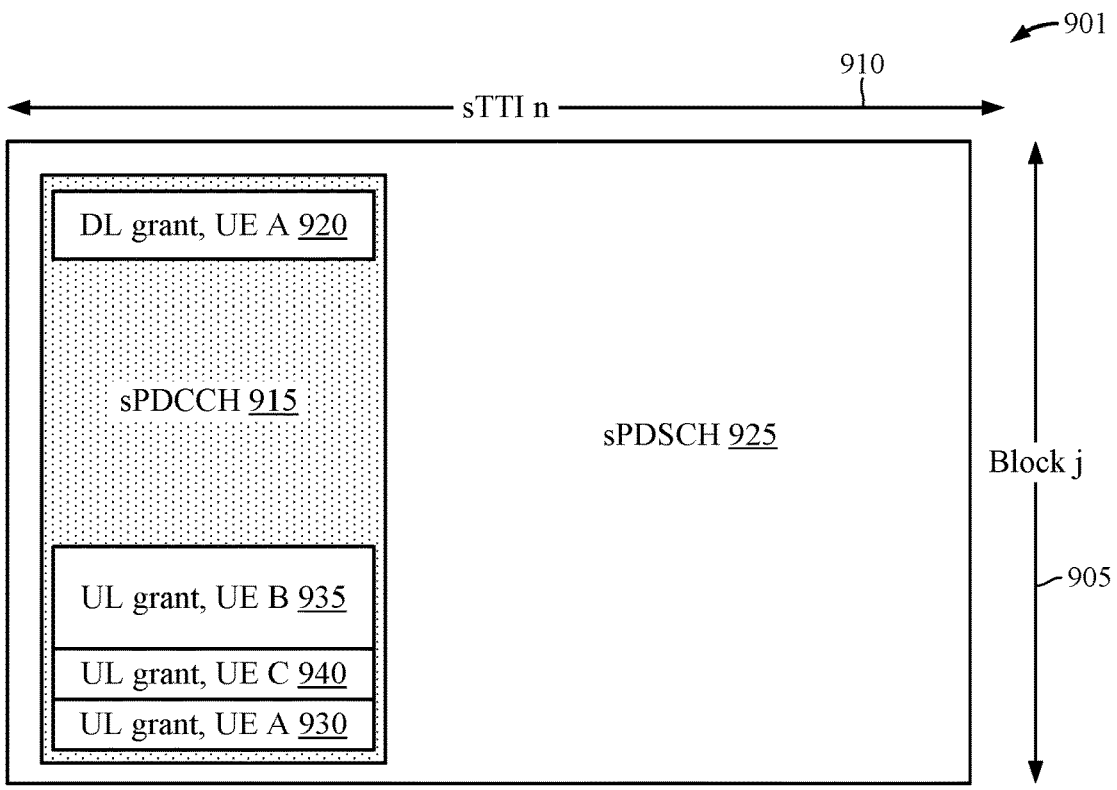
FIGS. 9A and 9B illustrate examples of resource allocation diagrams 901 and 902 for low latency applications, in accordance with certain aspects of the present disclosure.
Figure 9B:
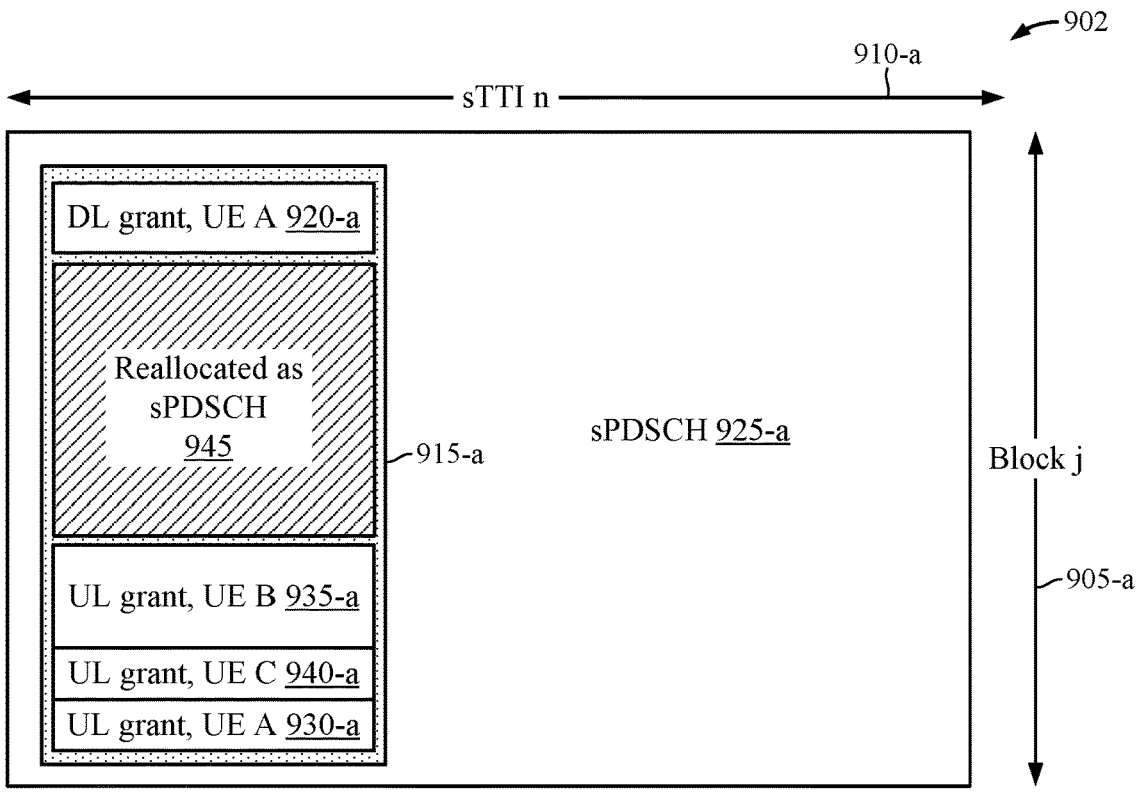

FIGS. 9A and 9B illustrate examples of resource allocation diagrams 901 and 902 for low latency applications, in accordance with certain aspects of the present disclosure.

Each of resource allocation diagrams 901 and 902 show a resource block 905 for a sTTI 910, where the resource block 905 includes a control region including sPDCCH 915 and a data region including sPDSCH 925 for UE A that is indicated by sPDCCH 915. In some cases, sPDCCH 915 may comprise or include one or more aspects of sPDCCH 840 and sPDCCH 860. Furthermore, in some cases, sPDCCH 915 may include at least one downlink grant 920 for the UE A. Some examples of a sPDCCH 915 may include one more uplink grants for one or more UEs, which may also include an uplink grant for the UE A. In some examples, resource allocation diagrams 901 and 902 may include uplink grant 930 for UE A, or uplink grant 935 for UE B, or uplink grant 940 for UE C, or a combination thereof.

As illustrated in resource allocation diagrams 901 and 902, a downlink grant 920 may be at the beginning of the sPDCCH 915, for example, at a position at a first boundary of the sPDCCH 915 control region. In some cases, the uplink grants may be clustered at the end of the control region, sPDCCH 915. The uplink grants may be transmitted by a base station in sPDCCH 915 of resource block 905 according to one of multiple different aggregation levels for UE A. In some examples, the aggregation level for UE A may have been indicated in a previously transmitted grant from base station. For example, a two-stage grant configuration may be used, such that the first grant in a previous transmission (e.g., a previous sTTI or TTI, such as a PDCCH in a previously-received TTI) may include the aggregation level for UE A, and the second grant may be the downlink grant 920. The uplink grant 930, uplink grant 935, and uplink grant 940 may be at the end of sPDCCH 915, with the uplink grant 930 for UE A at the end of sPDCCH 915 and located at a position at a second boundary of the sPDCCH 915 control region. In some cases, as depicted, uplink grant 935 and uplink grant 940 may be at positions adjacent to the uplink grant 930 for the UE A. In some cases, the span of sPDCCH 915 may be wide enough such that for any aggregation level that can be indicated for the UE A, the downlink grant 920 and multiple uplink grants may not overlap if the downlink grant 920 is at the beginning of sPDCCH 915 and the uplink grant(s)s are positioned at the end of sPDCCH 915.

The configuration of downlink grants at the beginning of sPDCCH 915 and uplink grants at the end of sPDCCH 915, may reduce the number of blind decoding attempts for a particular UE. For example, one downlink grant for the particular UE may be at the beginning of sPDCCH 915. If an attempted blind decode at the beginning of sPDCCH is unsuccessful, the UE may deduce that the sPDSCH 925 is not for that particular UE.

As illustrated in resource allocation diagram 902, a portion of the control region for sPDCCH 915 may be reallocated to be a part of data region for sPDSCH 925, thus recapturing unused control overhead from sPDCCH 915. Thus, reallocated sPDSCH 945 may be relocated from a portion of the sPDCCH 915-*a* between downlink grant 920-*a* and the uplink grants, specifically an uplink grant 935-*a* for UE B. The size of reallocated sPDSCH 945 may depend in part on the aggregation level. The resources of sPDCCH 915-*a* that are to be used for reallocated sPDSCH 945 may be signaled in the downlink grant 920-*a*. In particular, an indication may identify the start of the uplink grant region, which may include uplink grant 930-*a*, uplink grant 935-*a*, and uplink grant 940-*a* for sPDCCH 915-*a*. In some examples, the indication may be rate matching information field, as further described below.

In certain aspects, sTTIs with 1 symbol duration may be needed in order to support Ultra-Reliable and Low-Latency Communications (URLLC). URLLC requires sending a 32 byte packet with less than $10^{-5}$ transmission error rate and with less than 1 ms delay. A one symbol sTTI may meet this requirement as it may allow for up to three transmission attempts within 1 ms assuming a HARQ turnaround time of 8 symbols and assuming immediate, back to back transmission attempts.

However, current standards (e.g., RAN 1 specification) proposals are for sTTI of 2 symbols duration and 1 slot which supports ULLC requirements. For example, a 2 symbol sTTI may use the sTTI configurations described with reference to FIGS. 8 and 9. In certain aspects, standardizing one symbol sTTI as a standalone mode may require considerable design effort and changes and may further increase complexity of the base station scheduler and UE receiver. Thus, there is a need to modify current sPDCCH channel proposal such that it enables one symbol sTTI transmissions with minimal changes to the current sTTI configuration and signaling overhead. Further, the modified sTTI design may provide flexibility for UE receivers to handle both two symbol sTTI supporting ULLC as well as one symbol sTTI configurations to support URLLC requirements.

In certain aspects, in order to incorporate 1-symbol sTTI operation within the current 2-symbol and 1 slot design, certain sPDCCH design goals may need to be met by the modified design. For example, on a per sTTI basis, the modified design should allow assigning a low latency user with a variable resource allocation with reasonable granularity. Further, the specification of this allocation should not consume a significant number of control resources. The modified design should support assigning multiple low latency users within a given TTI. The DCI formats in the modified design should minimize payload wherever possible and have an average size smaller than that of legacy control. The modified design should support multiple aggregation levels per sTTI in a cell (but possibly a single level per UE) to adequately reach all low latency users in the cell. The modified design should minimize blind decodes, especially the minimum number of blind decodes required to receive DL grant. The modified design should optimize resource allocation between sPDCCH and sPDSCH by efficiently assigning control and data resources such that unused control resources are efficiently assigned for data transmission.

Certain aspects of the present disclosure discuss various techniques to enable 1-symbol sTTI operation within the current 2-symbol and 1 slot sTTI design by using, at least in part, 2-symbol sTTI configuration. In certain aspects, the modified 2-symbol sTTI design for enabling 1-symbol sTTI operation meets most of the design and performance goals noted above.

In certain aspects, the addition of 1-symbol sTTIs may leverage the current 2-symbol sTTI design. In other words, a 1-symbol sTTI transmission may inherit configuration elements of 2-symbol sTTI design. For example, setup of sPDCCH control resources and sPDSCH block resources may be common across 1-symbol and 2-symbol sTTIs. In an aspect, aggregation level is semi-statically assigned to a UE and used for both 1-symbol and 2-symbol sTTI control grants. In certain aspects, a minimal set of additional RRC configuration may be included to additionally support the 1-symbol sTTI. Further, configuration information (e.g., RRC configuration) may allow a URLLC UE to support both 1-symbol and 2-symbol sTTI reception. In an aspect, leveraging the current 2-symbol sTTI design for enabling 1-symbol sTTI may help limit RRC signaling to enable the 1-symbol sTTI operation.

In certain aspects, for highest efficiency, a base station scheduler may be able to intermix 2-symbol sTTI users simultaneously with 1-symbol sTTI users within the same sTTI resource block. In an aspect, the modified design may not require frequency division multiplexing 1-symbol and 2-symbol sTTI users, which would otherwise result in inefficient usage of sTTI resources.

The following description discusses three separate designs which efficiently enable 1-symbol sTTI operation within 2-symbol sTTI design and by using, at least in part, configuration of the 2-symbol sTTI.

Figure 10:
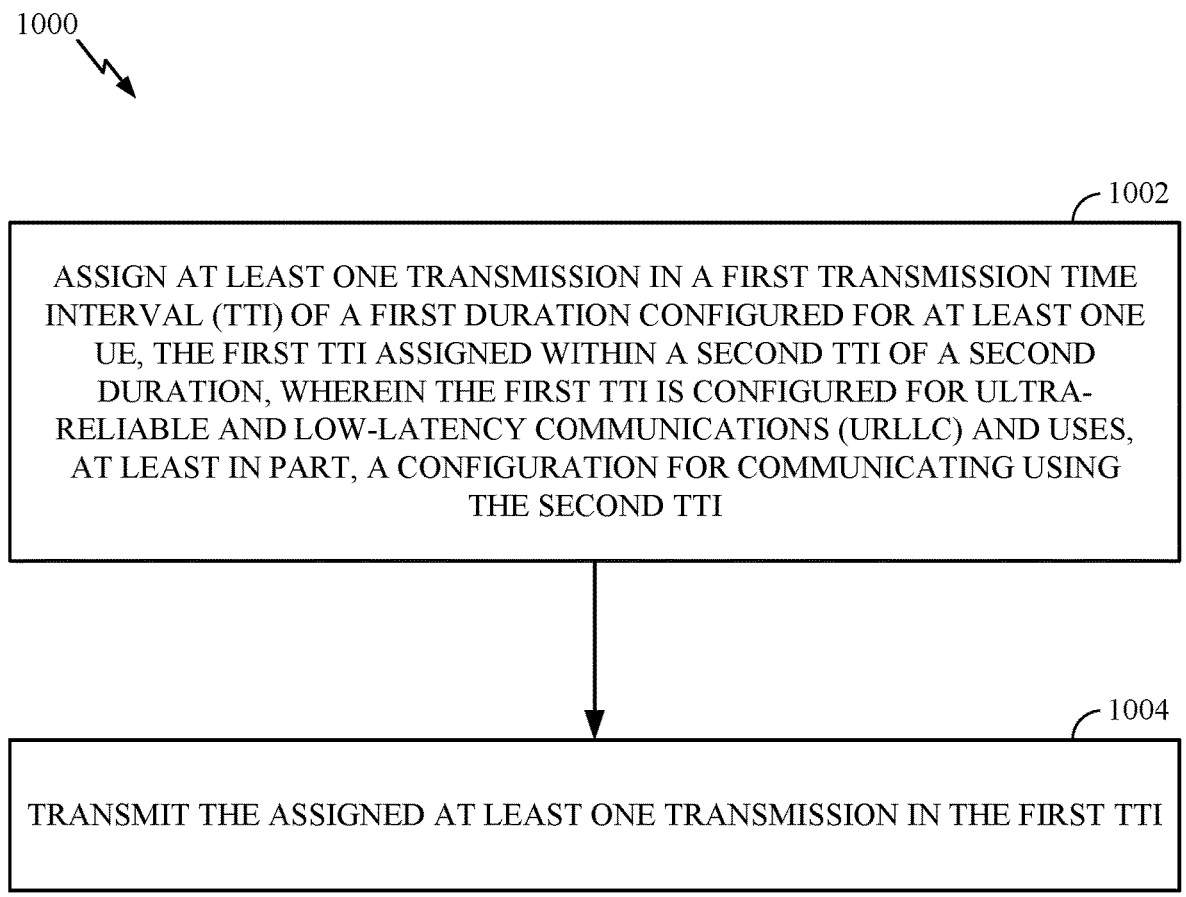
FIG. 10 illustrates example operations 1000 performed by a base station for enabling 1-symbol sTTI operation within the current 2-symbol sTTI design, in accordance with certain aspects of the present disclosure.

FIG. 10 illustrates example operations 1000 performed by a base station for enabling 1-symbol sTTI operation within the current 2-symbol sTTI design, in accordance with certain aspects of the present disclosure. Operations 1000 begin, at 1002, by assigning at least one transmission in a first Transmission Time Interval (TTI) of a first duration configured for at least one UE, the first TTI assigned within a second TTI of a second duration, wherein the first TTI is configured for Ultra-Reliable and Low-Latency Communications (URLLC) and uses, at least in part, a configuration for communicating using the second TTI. At 1004, the base station transmits the assigned at least one transmission in the first TTI. In an aspect, the first TTI corresponds to a 1-symbol sTTI and the second TTI corresponds to a 2-symbol sTTI.

Figure 11:
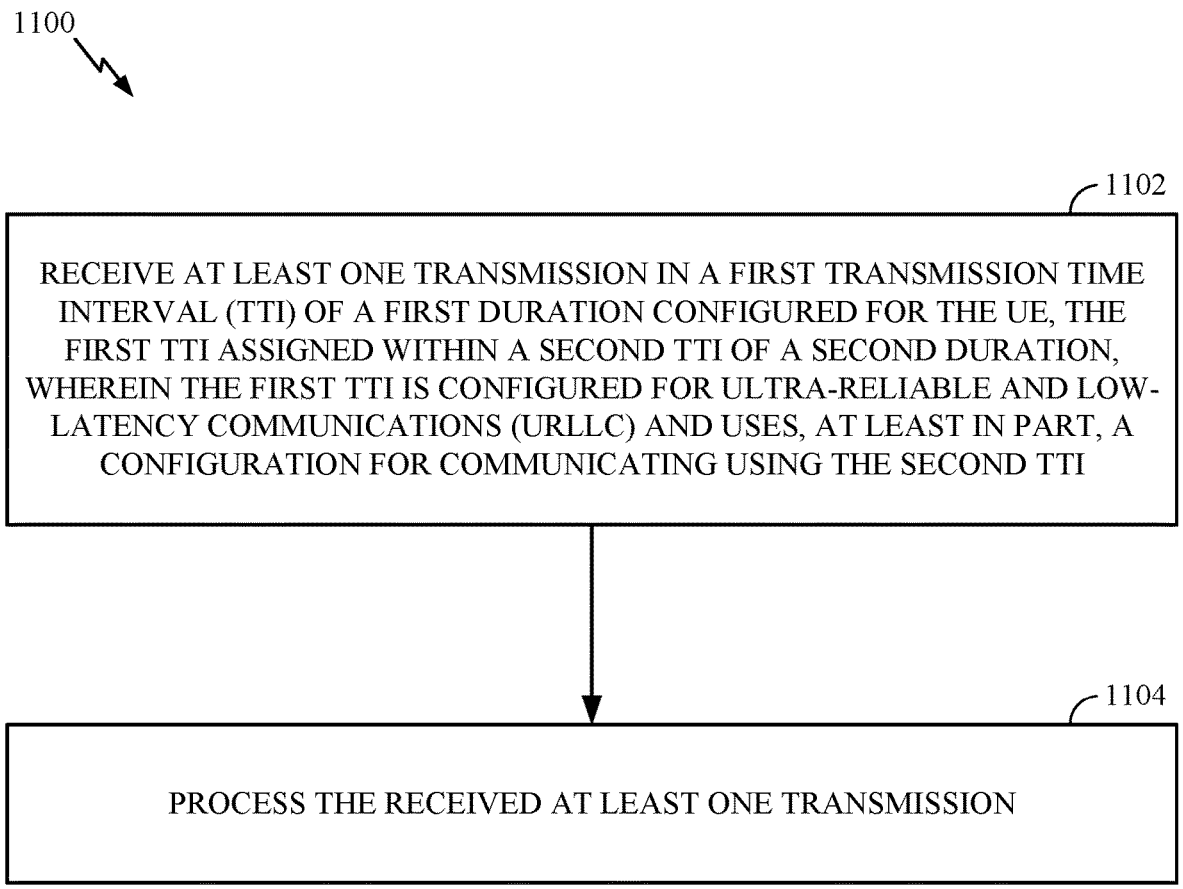
FIG. 11 illustrates example operations 1100 performed by a UE for receiving 1-symbol sTTI transmissions within a 2-symbol sTTI, in accordance with certain aspects of the present disclosure.

FIG. 11 illustrates example operations 1100 performed by a UE for receiving 1-symbol sTTI transmissions within a 2-symbol sTTI, in accordance with certain aspects of the present disclosure. Operations 1100 being, at 1102, by receiving at least one transmission in a first Transmission Time Interval (TTI) of a first duration configured for the UE, the first TTI assigned within a second TTI of a second duration, wherein the first TTI is configured for Ultra-Reliable and Low-Latency Communications (URLLC) and uses, at least in part, a configuration for communicating using the second TTI. At 1104, the UE processes the received at least one transmission. In an aspect, the first TTI corresponds to a 1-symbol sTTI and the second TTI corresponds to a 2-symbol sTTI.

In certain aspects, in one design, 2-symbol users and 1-symbol users are intermixed in the same 2-symbol sTTI resource block. In an aspect, DL grants for 1-symbol sTTI users are transmitted in a portion of the 2-symbol sTTI control region (e.g., sPDCCH) that is otherwise used for transmitting UL grants for 2-symbol sTTI users. In an aspect, a DL grant for a 1-symbol sTTI user identifies resources within the control region that are assigned for 1-symbol sPDSCH reception for the user.

Figure 12:
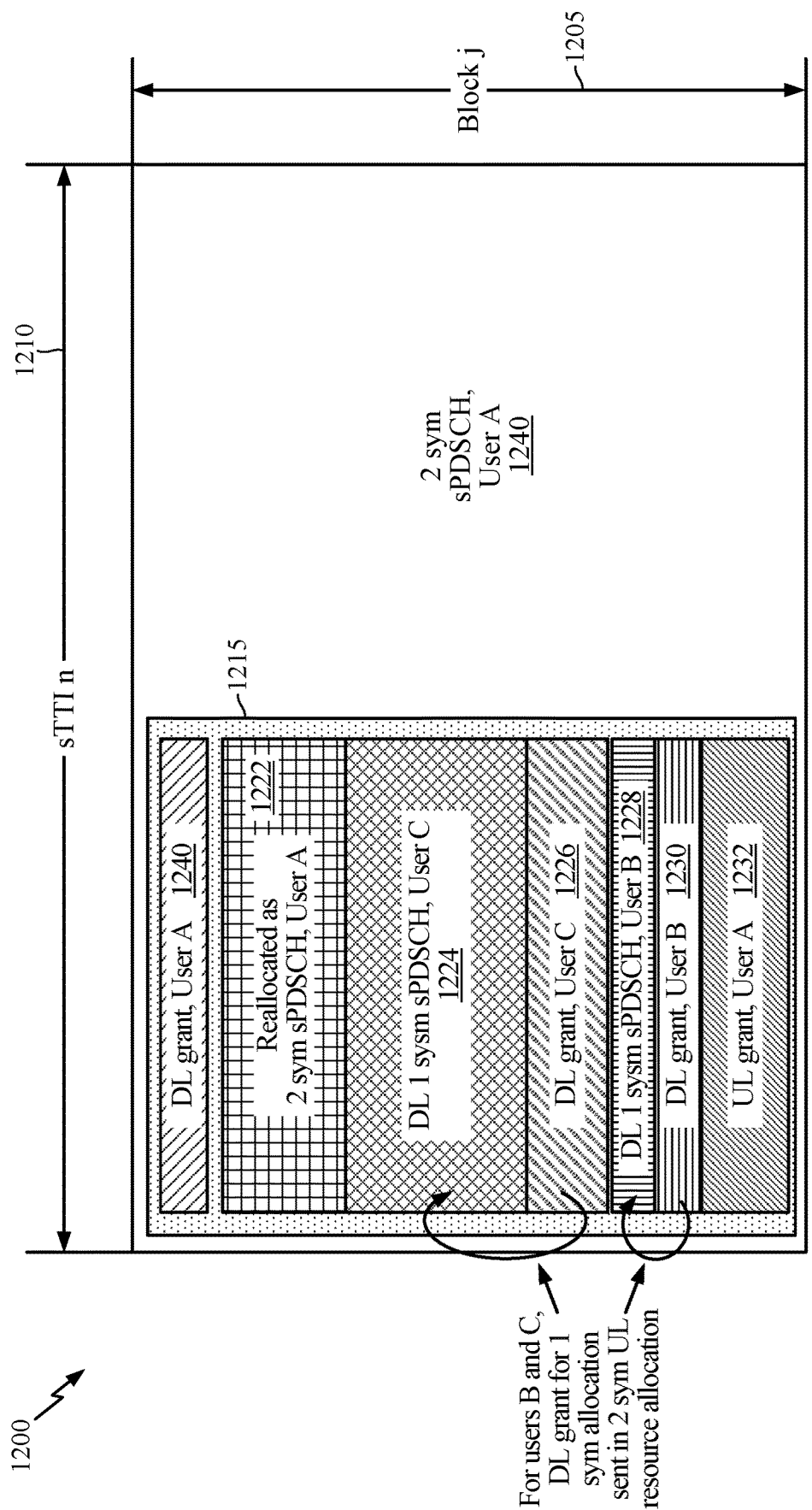
FIG. 12 illustrates an example resource allocation diagram 1200 for enabling 1-symbol sTTI within 2-symbol sTTI design, in accordance with certain aspects of the present disclosure.

FIG. 12 illustrates an example resource allocation diagram 1200 for enabling 1-symbol sTTI within 2-symbol sTTI design, in accordance with certain aspects of the present disclosure. It may be noted that the term 'user' and 'UE' may be used interchangeably.

The resource allocation diagram 1200 shows a resource block 1205 for a 2-symbol sTTI 1210, where the resource block 1205 includes a control region including sPDCCH 1215 in a first symbol and a data region including sPDSCH 1240 for a user A in a second symbol of the sTTI 1210. As shown, sPDCCH 1215 includes a DL grant 1220 for user A based on 2-symbol sTTI, the DL grant 1220 allocating sPDSCH 1240 to user A. As shown, resources for sPDSCH (e.g., sPDSCH 1224 and 1228) are also allocated in portions of the first symbol of sTTI 1210 that is not occupied by sPDCCH 1215.

As shown, 1-symbol sTTI users (e.g., URLLC users) B and C receive their respective downlink grants towards the end (e.g., in frequency domain) of the sPDCCH 1215 region which is otherwise allocated for UL grants for 2-symbol sTTI users. As shown, DL grant 1226 for user C and DL grant 1230 for user B are transmitted in the 2-symbol UL grant region of sPDCCH 1215. Further, DL grants 1226 and 1230 allocate sPDSCH for their respective users within the sPDCCH region 1215 on resources that are not used for transmitting DL grants or UL grants for 2-symbol sTTI operation. For example, as shown, the 1-symbol sPDSCH 1228 for user B and the 1-symbol sPDSCH 1224 for user C are allocated within the sPDCCH region 1215 in unused resources. In an aspect, the 1-symbol DL grants (e.g., DL grants 1226 and 1230) include sizing information about 1-symbol sPDSCH allocation in integer units of the DL shortened CCEs. The control allocation is generally done with a granularity of sCCE. In certain aspects, the 1-symbol DL grants may allocate sPDSCH resources outside the control region 1215 within the 1-symbol sTTI resource block. This is more probable when the sPDCCH 1215 does not span the entire system bandwidth. In certain aspects, the UL grants for 1-symbol sTTI users B and C may also be transmitted in the 2-symbol UL grant region.

Thus, by transmitting the DL grants for 1-symbol sTTI users in 2-symbol UL grant region and by allocating 1-symbol sPDSCH resources using unused control resources within the sPDCCH region 1215, the 1-symbol sTTI transmissions are transparent to a 2-symbol sTTI user. In certain aspects, the 2-symbol sTTI user A operates as defined by current standards for 2-symbol sTTI users and no knowledge of 1-symbol sTTI users or their allocations is required for 2-symbol sTTI operation.

As shown in FIG. 12, the sPDCCH 1215 further includes an UL grant 1232 for 2-symbol sTTI user A. sPDCCH 1215 further includes rate matching information (e.g, in DL grant 1220 for user A for reuse of unused sPDCCH region 1222 as part of 2-symbol sPDSCH allocation for user A.

In certain aspects, 1-symbol sTTI users (e.g., URLLC users B and C) may operate in a 2-symbol sTTI mode according to 2-symbol sTTI configuration, and may additionally be configured to search for 1-symbol sTTI grants for 1-symbol sTTI operation. In an aspect, a URLLC user capable of both 1-symbol sTTI and 2-symbol sTTI operation may be configured to search only 1-symbol sTTI grants, only 2-symbol sTTI grants, or both.

In certain aspects, since 1-symbol sTTI DL and UL grants are allocated in 2-symbol sTTI UL grant region, the UE needs to be able to differentiate between 1-symbol sTTI grants (e.g., DL and/or UL grants) and 2-symbol sTTI UL grants. In an aspect, 1-symbol sTTI UEs may be configured with separate RNTIs to differentiate between the types of grants. In an alternative aspect, a bit field may be allocated within a 1-symbol sTTI grant to differentiate between 1-symbol sTTI DL/UL grants and 2-symbol sTTI UL grants.

In certain aspects, in another design a 2-symbol sTTI resource block may be divided into two 1-symbol sTTI blocks, and each of the two symbols of the 2-symbol sTTI may be used for 1-symbol sTTI allocation only.

Figure 13:
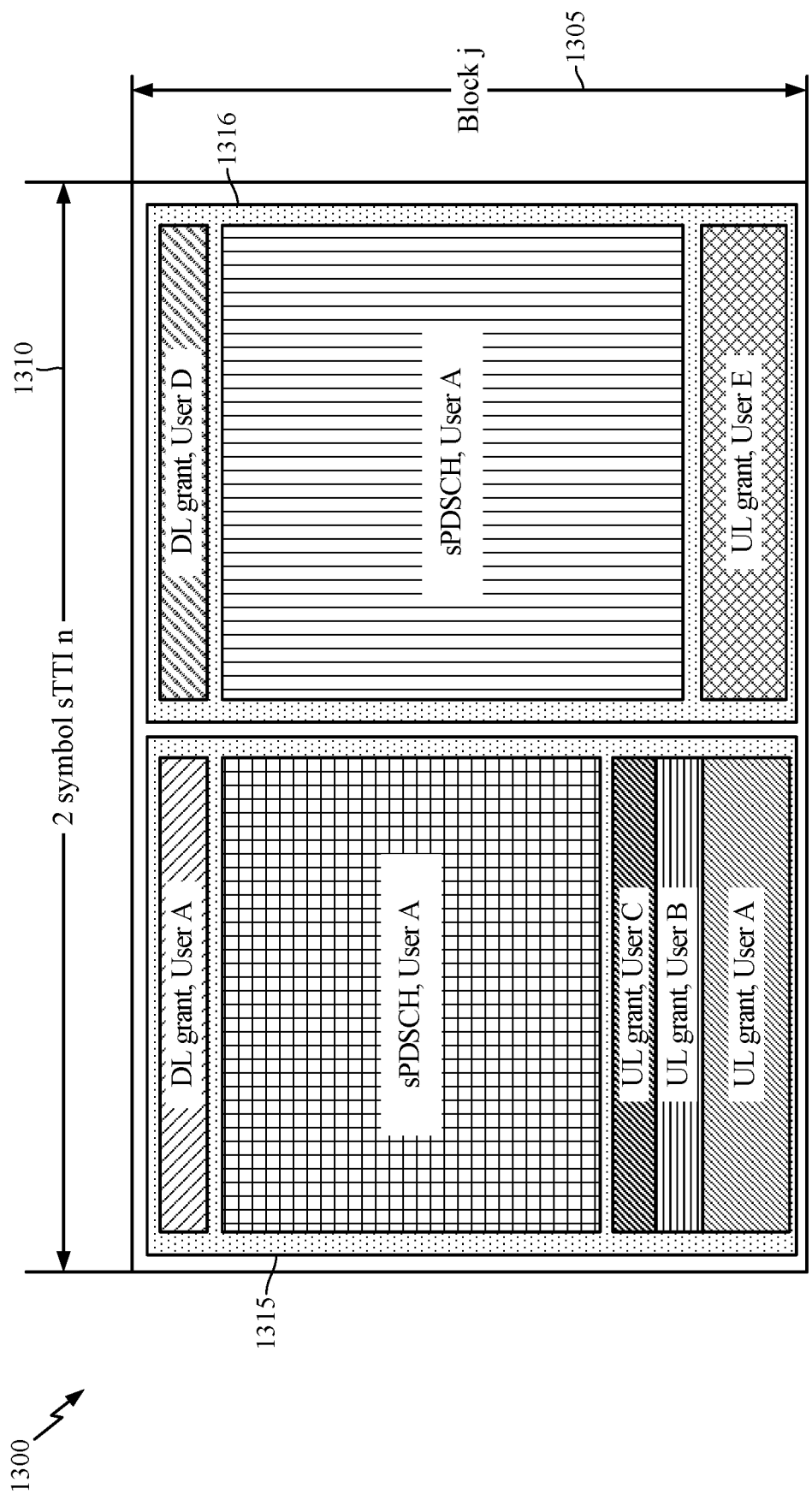
FIG. 13 illustrates an example resource allocation diagram 1300 for enabling 1-symbol sTTI within 2-symbol sTTI design, in accordance with certain aspects of the present disclosure.

FIG. 13 illustrates an example resource allocation diagram 1300 for enabling 1-symbol sTTI within 2-symbol sTTI design, in accordance with certain aspects of the present disclosure.

The resource allocation diagram 1300 shows a resource block 1305 configured for 2-symbol sTTI operation. Each symbol of the 2-symbol sTTI may be used for 1-symbol s-TTI operation. For example, as shown in the resource allocation diagram 1300, each symbol includes its own control region. As shown, the first symbol includes a control region, sPDCCH 1315 and the second symbol includes its own control region, sPDCCH 1316. All DL and UL grants in the sPDCCHs 1315 and 1316 correspond to 1-symbol sTTI operation and may be allocated to users operating in 1-symbol sTTI modes. The users A, B, C, D, and E shown in FIG. 13 are all 1-symbol sTTI users. Similar to 2-symbol sTTI configuration discussed above, the DL grants may be allocated at the beginning of each control region and the UL grants may be allocated towards the end of the control region. For example, as shown in 1300, sPDCCH 1315 in the first symbol of sTTI 1310 includes 1-symbol sTTI DL grant for user A and 1-symbol sTTI UL grants for users A, B, and C. Similarly, sPDCCH 1316 in the second symbol of sTTI 1310 includes 1-symbol sTTI DL grant for user D and 1-symbol sTTI UL grants for user E.

In certain aspects, similar to the 2-symbol sTTI configuration discussed above, each DL grant may allocate sPDSCH resources using unused control resources of the control region and/or other resources outside the control region within the 1-symbol sTTI resource block. In certain aspects, the 1-symbol sTTI DL grants in each of the symbols allocate sPDSCH within the control region of the same symbol on unused control resources reallocated as sPDSCH resources and/or other resources outside the control region within the respective 1-symbol sTTI resource block. For example, as shown sPDSCH for user A in the first symbol is allocated on resources between the DL grant for user A and the UL grant region. Similarly, sPDSCH for user D in the second symbol is allocated on unused control resources between the DL grant for user D and the UL grant region. In an aspect, like 2-symbol sTTI configuration, the reallocated sPDSCH region is determined by rate matching information included in DL grants.

In certain aspects, in this design, a 2-symbol sTTI user may be instructed (e.g, via RRC signaling) to avoid this resource block allocation (e.g., resource block 1305). Otherwise, a 2-symbol sTTI user may still search for DL and UL grants in the sTTI block 1305 but may not find any grants.

In certain aspects, in another design, high density 1-symbol sTTI may be implemented using semi-persistent scheduling (SPS). In certain aspects, for many low latency applications, the data burst size is small and data bursts are sent frequently. This generally results in high overheads in control plus data configurations. In this design, similar to the design of FIG. 13, a 2-symbol sTTI resource block may be used as two 1-symbol sTTI resource blocks and only 1-symbol sTTI transmission may be made using each of the two symbols. However, to reduce overhead resulting from high frequency data bursts, the downlink grants are not transmitted. Instead, only data (e.g., sPDSCH payloads) is transmitted in the entire control region of each symbol region. Further, this design supports a large number of users sending small sPDSCH payloads. In an aspect, resources within each control region are determined by aggregation level and the base station ensures that scheduled users do not collide on the same resources. Users may occupy specific resources within the control region at a specific aggregation level with a specific periodicity to receive sPDSCH payload. Users may determine a corresponding SPS transmission with specific RNTI usage.

Figure 14:
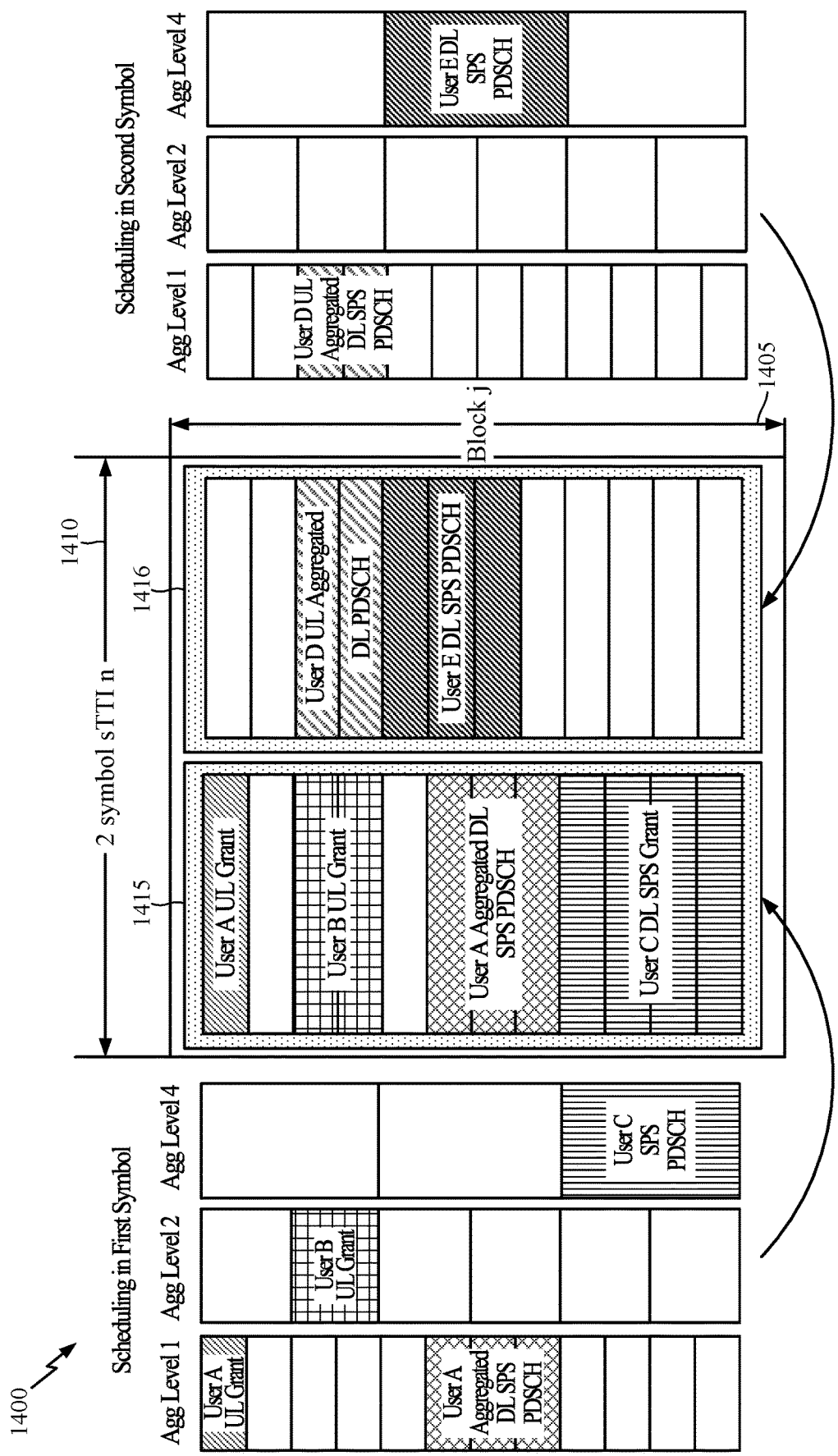
FIG. 14 illustrates an example resource allocation diagram 1400 for enabling high density 1-symbol sTTI within 2-symbol sTTI design, in accordance with certain aspects of the present disclosure.

FIG. 14 illustrates an example resource allocation diagram 1400 for enabling high density 1-symbol sTTI within 2-symbol sTTI design, in accordance with certain aspects of the present disclosure.

The resource allocation diagram 1400 shows a resource block 1405 configured for 2-symbol sTTI operation. Each symbol of the 2-symbol sTTI may be used for 1-symbol s-TTI operation. For example, as shown in the resource allocation diagram 1400, each symbol includes its own 1-symbol control region. As shown, the first symbol includes a control region, sPDCCH 1415 and the second symbol includes its own control region, sPDCCH 1416. As shown in 1400, scheduling in each of the first and the second symbols includes allocating UL grant and DL sPDSCH to each user based on an aggregation level. As shown, no DL grants are allocated to reduce overhead. As shown in 1400, the control region resources for each symbol are divided by aggregation levels. Each user is assigned a particular aggregation level and resources are assigned to the user based on its assigned aggregation level. For example, user A is assigned aggregation level 1 and the UL grants and sPDSCH for user A are assigned in control region resources corresponding to aggregation level 1. Similarly, control region resources are assigned to each user based on its assigned aggregation level. In an aspect, each of the symbols may be configured via SPS.

In certain aspects, each user may determine the region of the control region to monitor based on its assigned aggregation level and RNTI. In some cases, when the user is not assigned a particular aggregation level, it may monitor the entire control region (e.g., blind decode).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for generating, means for multiplexing, and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), comprising:
receiving at least one transmission in a first transmission time interval (TTI) of a first duration configured for the UE, the first TTI assigned within a second TTI of a second duration, wherein the first duration of the first TTI is a one-symbol duration, wherein receiving the at least one transmission comprises receiving at least one of a downlink grant message or an uplink grant message for the UE in a portion of a control region of the first TTI configured for uplink grant messages for the second TTI, the downlink grant message identifying resources within the control region for receiving downlink data by the UE and the uplink grant message identifying resources for transmitting uplink data by the UE; and processing the received at least one transmission.

2. The method of claim 1, wherein receiving the at least one transmission comprises receiving a short physical downlink shared channel (sPDSCH) transmission during the one symbol of the first TTI and not receiving another sPDSCH transmission or a short physical downlink control channel (sPDCCH) transmission during a portion of the second TTI not included in the single symbol TTI.

3. The method of claim 1, further comprising monitoring a short physical downlink control channel (sPDCCH) location within the one symbol TTI for a downlink grant of resources or an uplink grant of resources or both.

4. The method of claim 1, wherein the control region includes a shortened Physical Downlink Control Channel (sPDCCH) and the downlink data includes a shortened Physical Downlink Shared Channel (sPDSCH).

5. The method of claim 1, wherein the downlink grant message includes sizing information corresponding to the resources for receiving the downlink data in integer units of the downlink grant.

6. The method of claim 1, wherein a second portion of the control region includes a second downlink grant message, the second downlink grant message identifying resources for receiving downlink data by another UE configured to operate using the second TTI, wherein the resources are identified in a portion of at least one of the first and the second TTIs not occupied by the control region.

7. The method of claim 1, wherein the UE is configured to monitor downlink grant messages and uplink grant messages configured for the first TTI and the second TTI.

8. The method of claim 1, wherein different Radio Network Temporary Identifiers (RNTIs) are configured for the UE to differentiate between downlink control messages configured for the UE for operating using the first TTI and uplink control messages for operating using the second TTI.

9. The method of claim 1, wherein a bit field included in the downlink grant message differentiates between downlink control messages configured for the UE for operating using the first TTI and uplink control messages for operating using the second TTI.

10. A method for wireless communication by a user equipment (UE), comprising:

receiving at least one transmission in a first transmission time interval (TTI) of a first duration configured for the UE, the first TTI assigned within a second TTI of a second duration, wherein the first duration of the first TTI is a one-symbol duration, wherein:

the second TTI is divided into at least two TTIs of the first duration, the at least two TTIs including the first TTI; and receiving the at least one transmission comprises receiving, within at least one of the at least two TTIs, a downlink grant message for the UE in a portion of a control region of the at least one TTI, the downlink grant message including rate matching information identifying resources within the control region for receiving downlink data by the UE; and processing the received at least one transmission.

11. The method of claim 1, wherein:

the second TTI is divided into at least two TTIs of the first duration, the at least two TTIs including the first TTI; and receiving the at least one transmission comprises receiving, within at least one of the at least two TTIs, an uplink grant message for the UE in a portion of a control region of the at least one TTI configured for uplink grant messages, the uplink grant message identifying resources for transmitting uplink data by the UE.

12. A method for wireless communication by a user equipment (UE), comprising:

receiving at least one transmission in a first transmission time interval (TTI) of a first duration configured for the UE, the first TTI assigned within a second TTI of a second duration, wherein the first duration of the first TTI is a one-symbol duration, wherein:

the second TTI is divided into at least two TTIs of the first duration, the at least two TTIs including the first TTI; and receiving the at least one transmission comprises receiving, within at least one of the at least two TTIs, at least one of a downlink data or an uplink grant message for the UE in a control region of the at least one TTI, wherein resources for receiving the at least one of the downlink data and the uplink grant messages for the UE is determined based on an aggregation level assigned to the UE; and processing the received at least one transmission.

13. The method of claim 1, wherein the second duration is a two-symbol duration.

14. The method of claim 1, wherein the first and the second TTIs include shortened TTIs (sTTIs).

15. A method for wireless communication by a base station (BS), comprising:

assigning at least one transmission in a first transmission time interval (TTI) of a first duration configured for at least one UE, the first TTI assigned within a second TTI of a second duration, wherein the first duration of the first TTI is a one-symbol duration; and transmitting the assigned at least one transmission in the first TTI, wherein the transmitting comprises transmitting at least one of a downlink grant message or an uplink grant message for the at least one UE in a portion of a control region of the first TTI configured for uplink grant messages using the second TTI, the downlink grant message identifying resources within a control region for transmitting downlink data for the at least one UE and the uplink grant message identifying resources for receiving uplink data from the at least one UE.

16. The method of claim 15, further comprising transmitting, in a second portion of the control region, a second downlink grant message, the second downlink grant message identifying resources for transmitting downlink data to another UE configured to operate using the second TTI, wherein the resources are identified in a portion of the second TTI not occupied by the control region.

17. The method of claim 15, wherein the control region includes a shortened physical downlink control channel (sPDCCH) and wherein the resources for transmitting downlink data includes resources corresponding to a shortened physical downlink shared channel (sPDSCH).

18. The method of claim 15, further comprising transmitting, in the downlink grant message, sizing information corresponding to the resources for transmitting the downlink data in integer units of downlink shortened CCEs.

19. The method of claim 15, wherein different Radio Network Temporary Identifiers (RNTIs) are configured for the at least one UE to differentiate between downlink control messages configured for the at least one UE for operating using the first TTI and uplink control messages for operating using the second TTI.

20. The method of claim 15, transmitting a bit field in the downlink grant message that differentiates between downlink control messages configured for the at least one UE for operating using the first TTI and uplink control messages for operating using the second TTI.

21. A method for wireless communication by a base station (BS), comprising:
assigning at least one transmission in a first transmission time interval (TTI) of a first duration configured for at least one UE, the first TTI assigned within a second TTI of a second duration, wherein the first duration of the first TTI is a one-symbol duration; and
transmitting the assigned at least one transmission in the first TTI, wherein:
the second TTI is divided into at least two TTIs of the first duration, the at least two TTIs including the first TTI; and
the transmitting comprises transmitting, within at least one of the at least two TTIs, a downlink grant message for the at least one UE in a portion of a control region of the at least one TTI configured for downlink grant messages using the second TTI, the downlink grant message including rate matching information identifying resources within the control region for transmitting downlink data to the UE.

22. The method of claim 15, wherein:
the second TTI is divided into at least two TTIs of the first duration, the at least two TTIs including the first TTI; and
the transmitting comprises transmitting, within at least one of the at least two TTIs, an uplink grant message for the at least one UE in a portion of a control region of the at least one TTI configured for uplink grant messages using the second TTI, the uplink grant message identifying resources for receiving uplink data from the at least one UE.

23. A method for wireless communication by a base station (BS), comprising:
assigning at least one transmission in a first transmission time interval (TTI) of a first duration configured for at least one UE, the first TTI assigned within a second TTI of a second duration, wherein the first duration of the first TTI is a one-symbol duration; and
transmitting the assigned at least one transmission in the first TTI, wherein:
the second TTI is divided into at least two TTIs of the first duration, the at least two TTIs including the first TTI; and
transmitting, within at least one of the at least two TTIs, at least one of downlink data or an uplink grant message for the at least one UE in a control region of the at least one TTI, wherein resources for transmitting the at least one of the downlink data and the uplink grant messages for the at least one UE is determined based on an aggregation level assigned to the UE.

24. A method for wireless communication by a base station (BS), comprising:
assigning at least one transmission in a first transmission time interval (TTI) of a first duration configured for at least one UE, the first TTI assigned within a second TTI of a second duration, wherein the first duration of the first TTI is a one-symbol duration; and
transmitting the assigned at least one transmission in the first TTI, wherein:
for communication within a resource block with at least a first user equipment (UE) configured to use the one-symbol duration of the first TTI, transmitting the assigned at least one transmission in the first TTI comprises:
transmitting a grant of resources and a short physical data shared channel (sPDSCH) transmission to the first UE during the one symbol TTI, and not transmitting a short physical downlink control channel (sPDCCH) or another sPDSCH to the first UE during a portion of the second duration not included in the one symbol TTI; and
for communication within the resource block with at least a second UE configured to use multiple symbols of the second TTI, the method further comprises:
transmitting a grant of resources to the second UE in at least one symbol of the second duration and transmitting a short PDSCH during multiple symbols of the second duration.

25. An apparatus for wireless communication by a user equipment (UE), comprising:
at least one processor configured to:
receive at least one transmission in a first transmission time interval (TTI) of a first duration configured for the UE, the first TTI assigned within a second TTI of a second duration, wherein the first duration of the first TTI is a one-symbol duration wherein in order to receive the at least one transmission, the at least one processor is further configured to receive at least one of a downlink grant message or an uplink grant message for the UE in a portion of a control region of the first TTI configured for uplink grant messages for the second TTI, the downlink grant message identifying resources within the control region for receiving downlink data by the UE and the uplink grant message identifying resources for transmitting uplink data by the UE; and
process the received at least one transmission; and
a memory coupled with the at least one processor.

26. An apparatus for wireless communication by a base station (BS), comprising:
at least one processor configured to:
assign at least one transmission in a first transmission time interval (TTI) of a first duration configured for at least one UE, the first TTI assigned within a second TTI of a second duration, wherein the first duration of the first TTI is a one-symbol duration; and
transmit the assigned at least one transmission in the first TTI, wherein in order to transmit the assigned at least one transmission, the at least one processor is configured to transmit at least one of a downlink grant message or an uplink grant message for the at least one UE in a portion of a control region of the first TTI configured for uplink grant messages using the second TTI, the downlink grant message identifying resources within a control region for transmitting downlink data for the at least one UE and the uplink grant message identifying resources for receiving uplink data from the at least one UE; and
a memory coupled with the at least one processor.

27. The method of claim 10, wherein the control region includes a shortened Physical Downlink Control Channel (sPDCCH) and the downlink data includes a shortened Physical Downlink Shared Channel (sPDSCH).

28. The method of claim 12, wherein each of the at least two TTIs is configured via Semi-Persistent Scheduling (SPS).

29. The method of claim 21, wherein the control region includes a shortened physical downlink control channel (sPDCCH) and the downlink data includes data corresponding to a shortened physical downlink shared channel (sPDSCH).

* * * * *